United States Patent [19]
Saito

[11] Patent Number: 5,200,892
[45] Date of Patent: Apr. 6, 1993

[54] INTELLIGENT ELECTRONIC WORD PROCESSOR WITH PLURAL PRINT WHEELS AND TABLES USED TO IDENTIFY DISPLAYED CHARACTERS SUPPORTED BY DESIGNATED PRINT WHEELS

[75] Inventor: Keizo Saito, Nara, Japan

[73] Assignee: Sharp Kabushiki Kaisha, Osaka, Japan

[21] Appl. No.: 688,700

[22] Filed: Apr. 22, 1991

Related U.S. Application Data

[63] Continuation of Ser. No. 171,175, Mar. 21, 1988, abandoned, which is a continuation of Ser. No. 691,775, Jan. 16, 1985, abandoned.

[30] Foreign Application Priority Data

Jan. 17, 1984 [JP] Japan .................................. 59-6921
Jan. 30, 1984 [JP] Japan ........................... 59-12976[U]
Mar. 8, 1984 [JP] Japan .................................. 59-46318
Mar. 28, 1984 [JP] Japan .................................. 59-64141

[51] Int. Cl.$^5$ ........................................... G06F 15/403
[52] U.S. Cl. ................................. 364/419; 364/927.2; 364/930; 364/943.43; 364/963.3; 364/DIG. 2; 400/70; 400/83
[58] Field of Search ............................... 395/600, 100; 400/639.1, 642, 903, 144.2, 202, 470, 3, 7, 64, 171, 70, 83; 340/709, 711, 792, 723; 364/519, 419

[56] References Cited

U.S. PATENT DOCUMENTS

| | | | |
|---|---|---|---|
| 3,537,076 | 9/1970 | Damerau | 400/7 |
| 4,092,729 | 5/1978 | Rosenbaum | 364/419 |
| 4,197,022 | 4/1980 | Dollenmayer | 400/144.2 |
| 4,281,938 | 8/1981 | Phillips | 400/171 |
| 4,382,702 | 5/1983 | Fessel | 400/144.2 |
| 4,451,899 | 5/1984 | Yamazaki | 364/900 |
| 4,481,577 | 11/1984 | Forson | 364/200 |
| 4,555,773 | 11/1985 | Karnes, Jr. et al. | 364/900 |
| 4,584,648 | 4/1986 | Dlugos | 364/900 |
| 4,624,591 | 11/1986 | Barnes et al. | 400/171 |
| 4,686,649 | 8/1987 | Rush et al. | 364/900 |
| 4,742,485 | 5/1988 | Carlson et al. | 364/900 |
| 4,745,561 | 5/1988 | Hirosawa et al. | 340/735 |
| 4,768,164 | 8/1988 | Dreher | 364/900 |

FOREIGN PATENT DOCUMENTS 0076909 4/1983 European Pat. Off. .
0203411 12/1986 European Pat. Off. ............ 400/171

OTHER PUBLICATIONS

Moore et al, "Optimum Order of Print Wheel Selection in a Multi-Font Impact Printer", *IBM TDB*, vol. 22 No. 5, Oct. 1979.

*Primary Examiner*—Thomas C. Lee
*Assistant Examiner*—Eric Coleman

[57] ABSTRACT

An electronic word processor comprises a memory storing print data, a print wheel, and a check circuit for checking whether the type of the print wheel is suitable for printing out the print data. In the second form, the processor may store word data accompanied with hyphenate data in a selected group of words. In the third form, the processor may comprise a message memory for storing message sentences, and a modification circuit for modifying the message data. In the fourth form, the processor may comprise a control circuit featured in that one or more specific letters can be retrieved and replaced by one or more new letters in the unit of chapter.

2 Claims, 26 Drawing Sheets

|   | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 |   | ç | Ľ | Ű |   | ≤ | ˇ | n | = | ‰ | ≅ | o | { | } | \ | 0 |
| 1 |   | ŕ | Á | Í | Ś | ▼ | ‾ | ≥ | u | α | § | ~ | 1 | ∇ | ₌ | 1 |
| 2 |   | 0 | E | Ĺ | Š | = | < | ⌣ | c | B | k | σ | 2 | ⇀ | §̄ | Σ | 2 |
| 3 |   | ń | ż | ź | ŕ | − | > | ⌢ | ⊃ | ψ | ω | τ | 3 | Ϋ | Ω | → | 3 |
| 4 |   | š | Ž | Ź | Ř | + | R | ‖ | ● | ♦ | μ | ξ | 4 | ╪ | ∂ | ≡ | 4 |
| 5 |   | í | ů | ć | ť | ~ | ξ | ∠ | L | ε | ν | χ | 5 | ← | ~ | ∝ | 5 |
| 6 |   | G | Ů | Ć | Ť | ▼ | ∴ | < |   | π | o | δ | 6 | ↑ | ↓ | Δ | 6 |
| 7 |   | ă | ě | ĺ | ř | △ | ✦ | > | ⌣ | λ | p | χ | 7 | Λ | ℓ | ≡ | 7 |
| 8 |   | Á | Ě | L | Ř | → | ╲ | ∓ |   | η | y | υ | 8 | ↑ | Γ | T | 8 |
| 9 |   | ſ | d | ł | ś | ╱ | ↑ | ¤ |   | ι | δ | ς | 9 | ↔ | Θ | ≃ | 9 |
| A |   | S | Ď | ł | Ś | [ | ] | ′ | + | ┌ | T | ┐ | ⊥ | − | □ | ~ | ♭ |
| B |   | ţ | Ž | ň | í | t | · | ♀ | ± | ├ | ┼ | ┤ | ≙ | ♦ | □ | ¬ | 1/8 |
| C |   | Ţ | Ž | Ň | Ť | < | ✦ | ♂ | · | └ | ┴ | ┘ | · |   | ■ | ‾ | 3/8 |
| D |   | · | č | ń | ő | ( | ) | ‾ | ′ | │ | ™ | − | £ | ♣ |   | ▲ | 5/8 |
| E |   | ▾ | Č | Ń | Ő | © | ¨ | > | ~ | { | } | { | ¤ | ¯ | ʃ | 7/8 |
| F |   | a | í | ű | đ | ∕ | ▴ | ʃ | ® | ( | ) | { | ¥ | ₺ | ∠ | ∫ |

F I G . 5 (B)

| | Conditional Flag① | | | Normal | Control | ALT | Conditional Flag② |
|---|---|---|---|---|---|---|---|
| 00 | XX | XX | XX | 52H | 52H | 52H | XXX |
| 01 | XX | XX | XX | 42H | 42H | 42H | XXX |
| 02 | XX | XX | XX | 43H | 44H | 45H | XXX |
| ⌇ | | | | ⌇ | | | ⌇ |
| FF | XX | XX | XX | E3H | E4H | E5H | XXX |

FIG. 7

| | | |
|---|---|---|
| 10 pitch | 1 | Pica 10 / German Pica 10 / French Pica 10 |
| | 2 | Courier 72 / Courierlegal 10A / German Courier |
| 12 pitch | 3 | Elite / German Elite / Spanish Elite |
| | 4 | Gothic / German Gothic / Spanish Gothic |
| 15 pitch | 5 | Gothic / German Gothic / Spanish Gothic |
| | 6 | |
| PS | 7 | |
| | 8 | |

FIG. 8

¢!"#$%&'()*+,-./0123456789:;<=>
?§ABCDEFGHIJKLMNOPQRSTUVWXYZÄÖÜ^_
`abcdefghijklmnopqrstuvwxyzäöüß¬

FIG.10

¢!"#$%&'()*+,-./0123456789:;<=>?@
ABCDEFGHIJKLMNOPQRSTUVWXYZ[\]^_`
abcdefghijklmnopqrstuvwxyz{|}~¬

FIG.11

¢!"#$%&'()*+,-./0123456789:;<=>?
@ABCDEFGHIJKLMNOPQRSTUVWXYZ[\]^_
`abcdefghijklmnopqrstuvwxyz{|}~¨
~~´¨£¡˘.´§¬Æ†œ¿™ŒøⒸ°ïjßOåÅ¨æ¢` 1¤®

| Medium \ Character | ¶ | ] | } | ∫ | ∩ | ≥ | ⊂ | ∋ | ⊃ | ← | ⊙ | ⊖ | ™ | ∃ | ℵ | ∆ | ∞ | ⊓ | ⊐ | α | ψ | ε | λ | η | √ | κ | ω | υ | ρ | θ | σ | τ | ς | X |
|---|---|---|---|---|---|---|---|---|---|---|---|---|---|---|---|---|---|---|---|---|---|---|---|---|---|---|---|---|---|---|---|---|---|---|
| CRT | • | • | • | • | • | • | • | • | • | • | • | • | • | • | • | • | • | • | • | • | • | • | • | • | • | • | • | • | • | • | • | • | • | • |
| Keyboard for English | | | | | | | | | | | | | | | | | | | | | | | | | | | | | | | | | | |
| Keyboard for German | | | | | | | | | | | | | | | | | | | | | | | | | | | | | | | | | | |
| Keyboard for French | | | | | | | | | | | | | | | | | | | | | | | | | | | | | | | | | | |
| Pica Legal 10A | • | | | | | | | | | | | | | | | | | | | | | | | | | | | | | | | | | |
| German Pica 10A | | | | | | | | | | | | | • | | | | | | | | | | | | | | | | | | | | | |
| Spanish Pica 10 | | | | | | | | | | | | | | | | | | | | | | | | | | | | | | | | | | |
| French Pica 10 | | | | | | | | | | | | | | | | | | | | | | | | | | | | | | | | | | |
| Pica Norsk 10 | | | | | | | | | | | | | | | | | | | | | | | | | | | | | | | | | | |
| German Courier 10 | | | | | | | | | | | | | | | | | | | | | | | | | | | | | | | | | | |
| Courier Legal 10A | • | | | | | | | | | | | | • | | | | | | | | | | | | | | | | | | | | | |
| German Elite 12 | | | | | | | | | | | | | | | | | | | | | | | | | | | | | | | | | | |
| Spanish Elite 12 | | | | | | | | | | | | | | | | | | | | | | | | | | | | | | | | | | |
| Elite 12 | | | | | | | | | | | | | | | | | | | | | | | | | | | | | | | | | | |
| Elite 12-S | | | | | | | | | | | | | • | | | | | | | | | | | | | | | | | | | | | |
| Dual Gothic Legal 12 | • | | | | | | | | | | | | | | | | | | | | | | | | | | | | | | | | | |
| Germany Cubic PS | | | | | | | | | | | | | | | | | | | | | | | | | | | | | | | | | | |
| Netherlands Cubic PS | | | | | | | | | | | | | | | | | | | | | | | | | | | | | | | | | | |
| Canada Cubic PS | | | | | | | | | | | | | | | | | | | | | | | | | | | | | | | | | | |
| Great Britain Cubic PS | | | | | | | | | | | | | | | | | | | | | | | | | | | | | | | | | | |
| France Cubic PS | | | | | | | | | | | | | | | | | | | | | | | | | | | | | | | | | | |
| Germany Rōman PS | | | | | | | | | | | | | | | | | | | | | | | | | | | | | | | | | | |
| Netherlands Rōman PS | | | | | | | | | | | | | | | | | | | | | | | | | | | | | | | | | | |
| Canada Rōman PS | | | | | | | | | | | | | | | | | | | | | | | | | | | | | | | | | | |
| Great Britain Rōman PS | | | | | | | | | | | | | | | | | | | | | | | | | | | | | | | | | | |
| France Rōman PS | | | | | | | | | | | | | | | | | | | | | | | | | | | | | | | | | | |
| Scientific 10 | • | • | • | • | • | • | • | • | • | • | • | • | • | • | • | • | • | • | • | • | • | • | • | • | • | • | • | • | • | • | • | • | • | • |

| A | B | C | D |
|---|---|---|---|
| E | F | G | H |
| I | | | |

FIG. 20

| K | L | M | N | N' | O | P |
|---|---|---|---|----|---|---|

FIG. 21

| Q | R | S | --- | T | U | |
|---|---|---|-----|---|---|---|

FIG. 22

Change Page Format

ID    ITEM

▶ Change Format (Page)

▶ Change Format (Line)

▶ Change Format (Style)

▶ Change Header And Footer

▶ Return Base Format (Page)

▶ Return Base Format (Line)

▶ Return Preceding Format (Page)

▶ Return Preceding Format (Line)

▶ Get Format File (Page)

▶ Get Format File (Line)

FIG. 23

| 12 | 02 12 00 73 | 05 06 00 01 | 07 10 00 9D |

| 08 10 00 9E | 09 10 00 9F | 10 10 00 A0 |

| 11 10 00 A1 | 12 10 00 A2 | 13 10 00 A3 |

| 14 10 00 A4 | 15 10 00 71 | 16 10 00 72 | FF |

```
       * * *  SYSTEM  MESSAGE  * * *
REST   + 02400 BYTE

▶ 00-00

----*----1----*----2----*----3----*----4-
Task    Selection
```

FIG.25(B)

```
       * * *  SYSTEM  MESSAGE  * * *
REST   + 02400 BYTE

▶ 00-9D  (0010, 0012, 0020)

----*----1----*----2----*----3----*----4-
Change    Format (Page)
```

FIG.25(C)

```
       * * *  SYSTEM  MESSAGE * * *
REST  + 02404 BYTE

▶ 00-9D (0010, 0012, 0020)
       ┌─────────────────┐
       │                 │
       └─────────────────┘
----*----1----*----2----*----3----*----4-
Change    Format (Page)
┌──────────────────────────┐
│ Change   Page   Format   │
└──────────────────────────┘
```

Change Page Format

ID ITEM

▶ Change Page Format

▶ Change Line Format

▶ Change Style

▶ Change Header And Footer

▶ Return Base Format (Page)

▶ Return Base Format (Line)

▶ Return Preceding Format(Page)

▶ Return Preceding Format(Line)

▶ Get Format File (Page)

▶ Get Format File (Line)

FIG. 26

| 33 | Change Page Format | / | 0010 | 0012 | 0020 | FF |

| 18 | Set Secret Key | / | 0050 | FF | | |
| 31 | Change Format (Page) | / | 0010 | 0012 | 0020 | FF |
| 31 | Change Format (Line) | / | 0010 | 0012 | 0021 | FF |
| 31 | Change Format (Style) | / | 0010 | 0012 | 0023 | FF |
| 33 | Change Header And Footer | / | 0010 | 0012 | 0024 | FF |
| 34 | Return Base Format (Page) | / | 0010 | 0012 | 0025 | FF |
| 34 | Return Base Format (Line) | / | 0010 | 0012 | 0026 | FF |
| 39 | Return Preceding Format (Page) | / | 0010 | 0018 | 0029 | FF |
| 39 | Return Preceding Format (Line) | / | 0010 | 0019 | 0030 | FF |

FIG. 27

| 18 | Set Secret Key | / | 0050 | FF | | |
| 30 | Change Page Format | / | 0010 | 0012 | 0020 | FF |
| 30 | Change Line Format | / | 0010 | 0012 | 0021 | FF |
| 23 | Change Style | / | 0010 | 0012 | 0023 | FF |
| 33 | Change Header And Footer | / | 0010 | 0012 | 0024 | FF |
| 34 | Return Base Format (Page) | / | 0010 | 0012 | 0025 | FF |
| 34 | Return Base Format (Line) | / | 0010 | 0012 | 0026 | FF |
| 39 | Return Preceding Format (Page) | / | 0010 | 0018 | 0029 | FF |
| 39 | Return Preceding Format (Line) | / | 0010 | 0019 | 0030 | FF |

FIG. 28

| 27 | Seitenformat ändern | / | 0010 | 0012 | 0020 | FF |
| 27 | Zeilenformat ändern | / | 0010 | 0012 | 0021 | FF |
| 25 | Formatstil ändern | / | 0010 | 0012 | 0023 | FF |
| 30 | Fuß- und Kopfzeile ändern | / | 0010 | 0012 | 0024 | FF |
| 30 | Zurück Basis-seitenformat | / | 0010 | 0012 | 0025 | FF |
| 34 | Zurück zum Basis-Zeilenformat | / | 0010 | 0012 | 0026 | FF |
| 43 | Zurück zum Vorhergehenden seitenformat | / | 0010 | 0018 | 0029 | FF |
| 43 | Zurück zum Vorhergehenden Zeilenformat | / | 0010 | 0019 | 0030 | FF |

FIG. 29

Seitenformat ändern

ID    NOTIZ

▶ Seitenformat ändern

▶ Zeilenformat ändern

▶ Formatstil ändern

▶ Fuß – und Kopfzeile ändern

▶ Zurück Basis – seitenformat

▶ Zurück zum Basis – Zeilenformat

▶ Zurück zum Vorhergehenden seitenformat

▶ Zurück zum Vorhergehenden Zeilenformat

▶ Hole Format dabe: (Seite)

▶ Hole Format dabe: (Zeile)

FIG. 30

Message          Patch

ID      ITEM           CHOICE       COMMENT

▶ Unit                    |   1=Unit-0, 2=Unit-1

Floppy Disk name                 _____

▶ Select Message Table    |
                              1 = England/America
                              2 = German
                              3 = French
                              4 = Other ▶ Exchange    Message ▶ Print    Out    Message

```
    Chapter 5-Sorting . . . . . . . . . . . . . . . . . . 1
*5.1. Combinatorial Properties of permutations . . . . . 11
    *5.1.1. Inversions . . . . . . . . . . . . . . . . . 11
     5.1.2. Permutations of a Multiset . . . . . . . . . 22
     5.1.3. Runs . . . . . . . . . . . . . . . . . . . . 37
     5.1.4. Tableaux and Involutions . . . . . . . . . . 48
 5.2. Internal Sorting . . . . . . . . . . . . . . . . . 73
     5.2.1. Sorting by Insertion . . . . . . . . . . . . 80
     5.2.2. Sorting by Exchanging . . . . . . . . . . . 105
     5.2.3. Sorting by Selection . . . . . . . . . . . 139
     5.2.4. Sorting by Merging . . . . . . . . . . . . 159
     5.2.5. Sorting by Distribution . . . . . . . . . . 170
 5.3. Optimum Sorting . . . . . . . . . . . . . . . . . 181
     5.3.1. Minimum-Comparison Sorting . . . . . . . . 181
     5.3.2. Minimum-Comparison Merging . . . . . . . . 198
     5.3.3. Minimum-Comparison Selection . . . . . . . 209
     5.3.4. Networks for Sorting . . . . . . . . . . . 220
 5.4. External Sorting . . . . . . . . . . . . . . . . 247
     5.4.1. Multiway Merging and Replacement Selection 251
     5.4.2. The Polyphase Merge . . . . . . . . . . . 266
     5.4.3. The Cascade Merge . . . . . . . . . . . . 289
     5.4.4. Reading Tape Backwards . . . . . . . . . . 301
     5.4.5. The Oscillating Sort . . . . . . . . . . . 314
    *5.4.6. Practical Considerations for Tape Merging 320
    *5.4.7. External Radix Sorting . . . . . . . . . . 343
     5.4.8. Two-Tape Sorting . . . . . . . . . . . . . 352
     5.4.9. Disks and Drums . . . . . . . . . . . . . 361
 5.5. Summary History and Bibliography . . . . . . . . 379
    Chapter 6-Searching . . . . . . . . . . . . . . . . 380
 6.1. Sequential Searching . . . . . . . . . . . . . . 393
 6.2. Searching by Comparison of Keys . . . . . . . . . 406
     6.2.1. Searching an Ordered Table . . . . . . . . 406
     6.2.2. Binary Tree Searching . . . . . . . . . . 422
     6.2.3. Balanced Trees . . . . . . . . . . . . . . 451
     6.2.4. Multiway Trees . . . . . . . . . . . . . . 475
 6.3. Digital Searching . . . . . . . . . . . . . . . . 481
```

FIG. 33

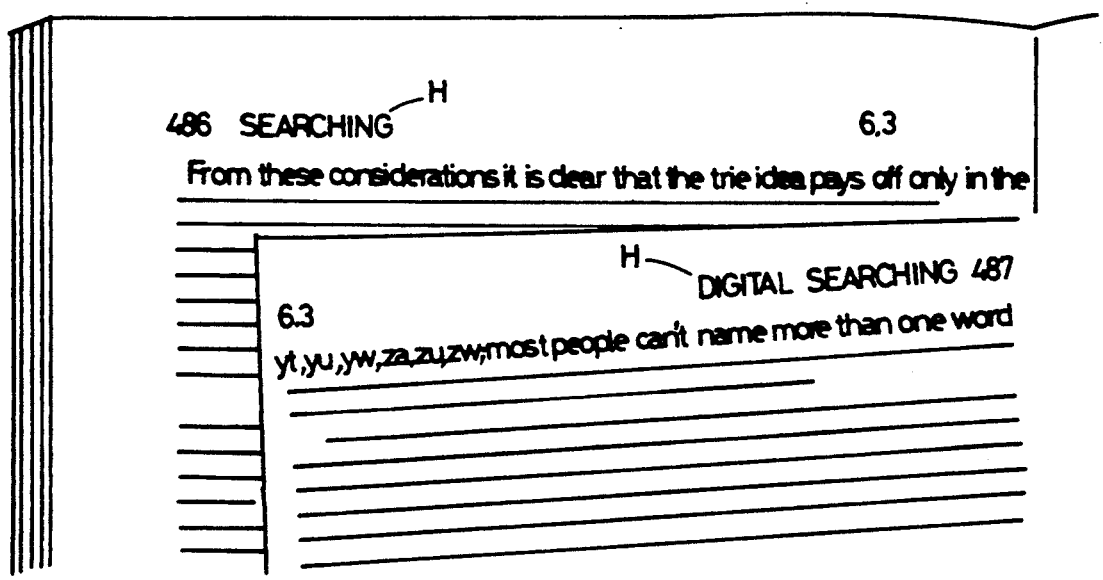

FIG. 34

INTELLIGENT ELECTRONIC WORD PROCESSOR WITH PLURAL PRINT WHEELS AND TABLES USED TO IDENTIFY DISPLAYED CHARACTERS SUPPORTED BY DESIGNATED PRINT WHEELS

This application is a continuation of application Ser. No. 07/171,175 filed on Mar. 21, 1988, now abandoned, which is a continuation of application Ser. No. 06/691,775 filed on Jan. 16, 1985, now abandoned.

BACKGROUND OF THE INVENTION

The present invention relates to a word processing machine and, more particularly, to an intelligent word processor.

Conventionally, a word processing machine or processor is provided with a printer with a daisy wheel for printing out characters. The number of the characters to be provided by a single kind of crown or daisy wheel is limited. Further, any other type of characters may be needed other than those presented by a specific type of crown or daisy wheel.

In such a case, to inform the presence of a specific type of character other than those of the operatively coupled crown or daisy wheel, the word processor prints out a space or any other alternative other than those of the operatively coupled crown or daisy wheel by neglecting the character information. Otherwise, it must stop at any specific character other than those of the print wheel operatively coupled, so that the operator's instruction is awaiting.

SUMMARY OF THE INVENTION

Accordingly, it is an object of the present invention to provide an improved electronic word processing machine being prepared to print out any specific character other than those of an operatively coupled print wheel.

It is another object of the present invention to provide an improved electronic word processor for checking whether a presently coupled printing head has characters corresponding to inputted characters.

It is a further object of the present invention to provide an improved electronic word processor for automatically hyphenating words when printing out them.

It is still a further object of the present invention to provide an improved electronic word processor for selecting a message to be outputted to inform the operator of a specific condition requesting the operator's instruction.

It is yet a further object of the present invention to provide an improved electronic word processor for utilizing data of running heads and footnotes in defining a specific zone in the unit of chapter in which a search and replacement function is accomplished.

Briefly described, in accordance with the first preferred embodiment of the present invention, a word processor is characterized by comprising memory means for storing print data, print wheel means for printing out the print data, and check means for checking whether the type of the print wheel means has a suitable print wheel for printing out the print data.

In accordance with the second preferred embodiment of the present invention, the word processor comprises memory means for storing spelling data, the memory means further storing hyphenate data for some selected words comprising some or more letters, and print means for automatically printing out the word data automatically together with the hyphenate data.

In accordance with the third preferred embodiment of the present invention, the word processor comprises message sentence means for storing message sentences telling system questions, and modification means for changing the message sentences.

In accordance with the fourth preferred embodiment of the present invention, the word processor comprises letter selection means for selecting and inputting one or more letters to be retrieved and replaced, chapter selecting means for selecting and defining a sentence region in the unit of chapter in which the one or more letters are retieved, and retrieval means responsive to said chapter selection means for retrieving the one or more letters and replacing them with new one or more new letters.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIGS. 1, 2, 3, and 4 are a plan view of a keyboard of a word processor according to a first preferred embodiment of the present invention;

FIGS. 5(A) and 5(B) are an illustration of a table of character codes;

FIG. 7 is an illustration of a table for explaining a relation between characters and modes according to the first preferred embodiment;

FIG. 8 is an illustration of a table for explaining character styles according to the first preferred embodiment;

FIGS. 10, 11, and 12 are an illustration of a table showing different characters used for the first preferred embodiment;

Figure 13A:
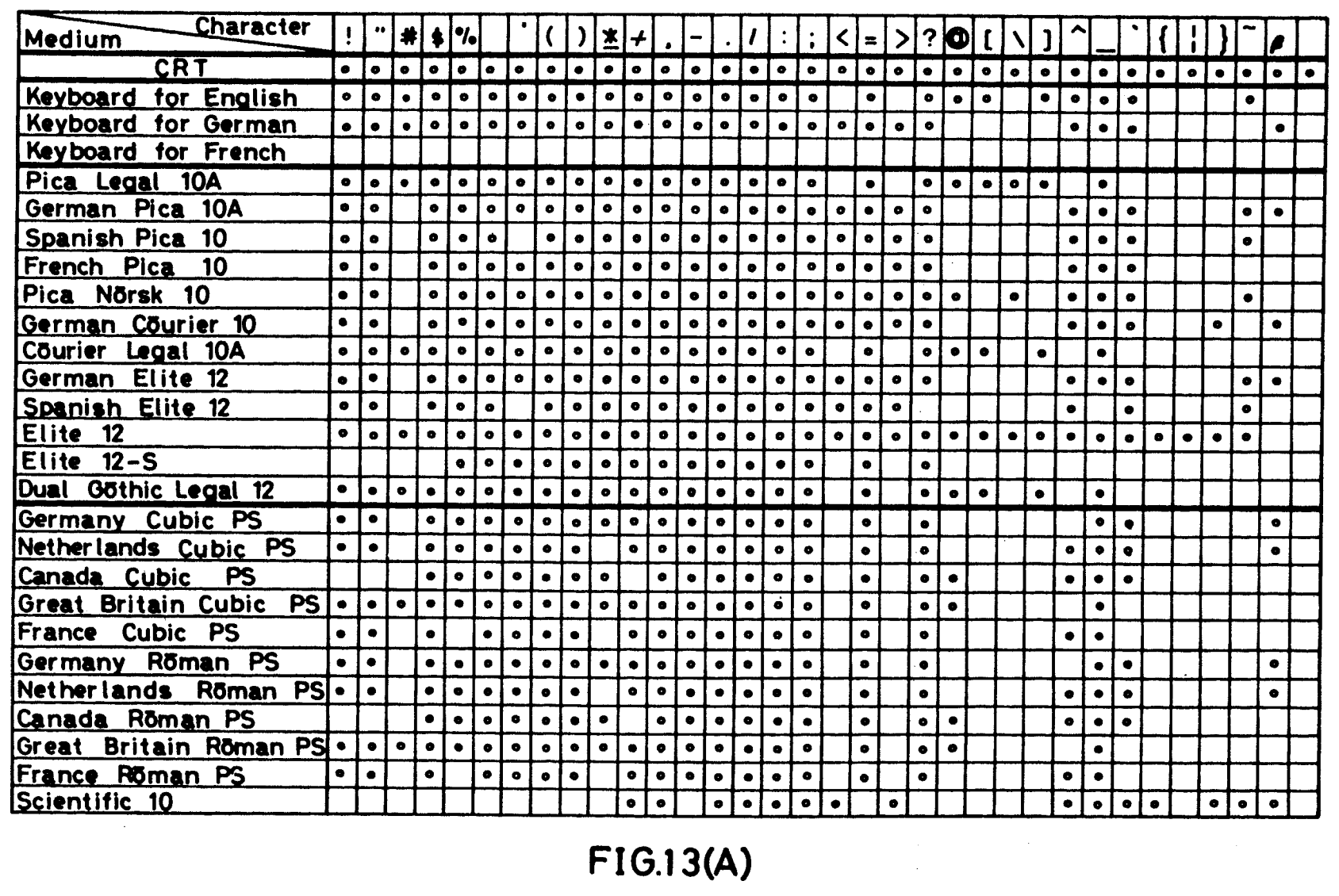
Figure 13B:
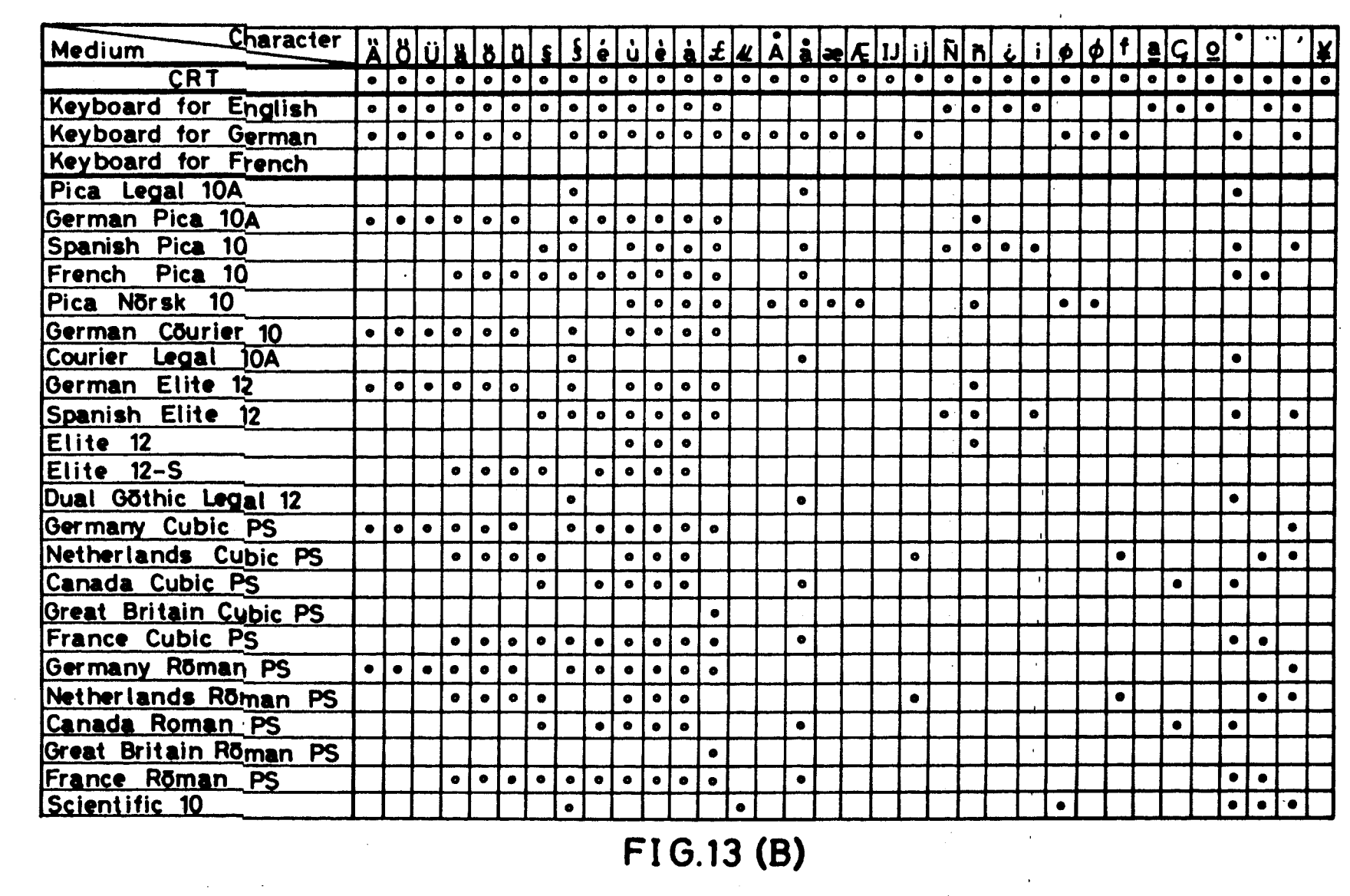
Figure 13C:
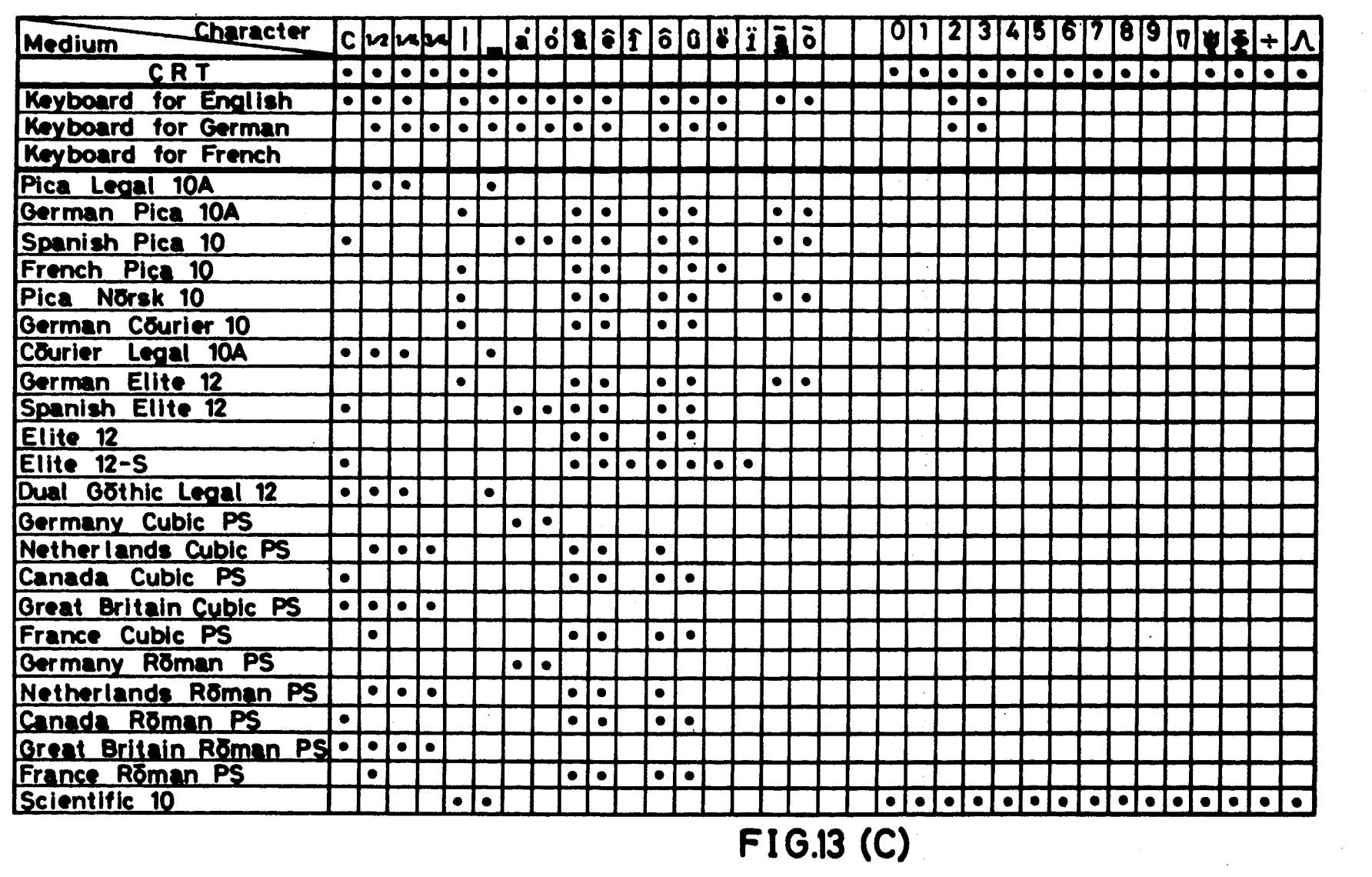

FIGS. 13(A), 13(B), 13(C), and 13(D) are an illustration of a table of characters used for the first preferred embodiment;

FIG. 16 is a drawing of a format of a dictionary for storing specific words;

FIG. 17 is a drawing of a data format of the dictionary of FIG. 16;

FIGS. 20, 21, and 22 are drawings for a structure of storage of data in the third preferred embodiment;

FIGS. 23, 26 are a drawings of displayed formats in a display in accordance with the third preferred embodiment;

FIG. 24 is a drawing of a configuration of inputted data for the third preferred embodiment;

FIGS. 25(A), 25(B), and 25(C) are illustrations for explaining a modification of a message in the third preferred embodiment;

FIGS. 27, 28, and 29 are drawings of a storage data of specific message sentences used for the third preferred embodiment;

FIGS. 30 and 31 are drawings of a displayed picture in a display according to the third preferred embodiment;

FIG. 32 is a drawing of a structure of a file used in a word processor according to a fourth preferred embodiment of the present invention;

FIG. 33 is a drawing of a page of a book containing contents, the chapters, and pages used for the fourth embodiment;

FIG. 34 is a drawing of a page containing a running head title in the fourth preferred embodiment;

FIG. 35 is a drawing of a data format representative of running head titles in the data file in the fourth preferred embodiment.

DESCRIPTION OF THE INVENTION

Figure 1:
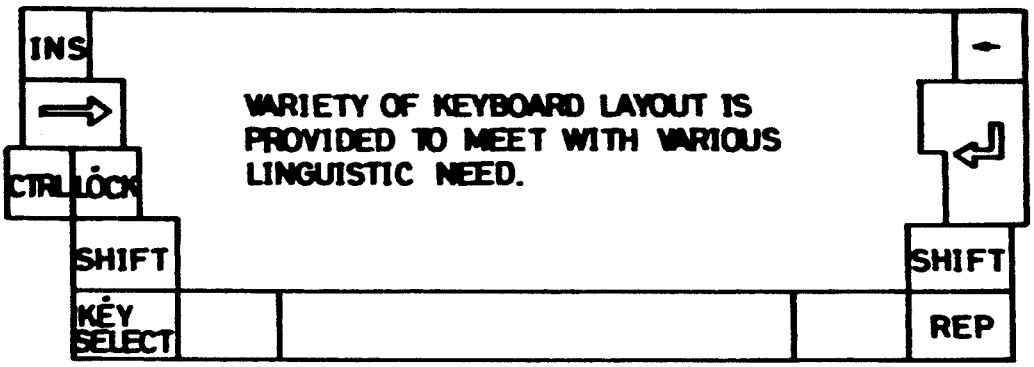
Figure 2:
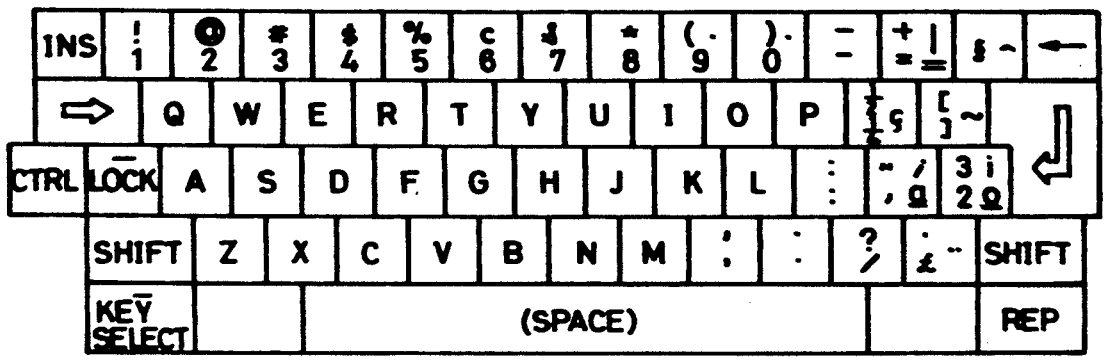
Figure 3:
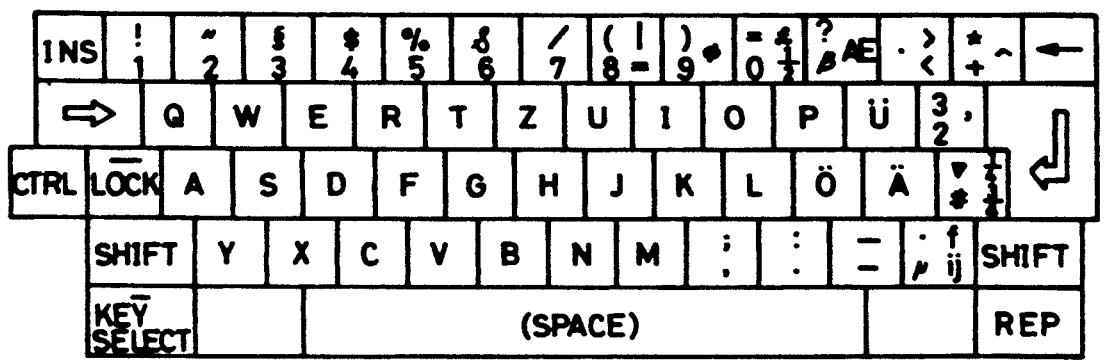

FIGS. 1, 2, and 3 are a keyboard for a word processor according to the first preferred embodiment of the present invention.

In accordance with the principle of the present invention, as apparently shown in FIG. 1, some key switches in the keyboard have indefinite instructions.

Figures 4, 5A:
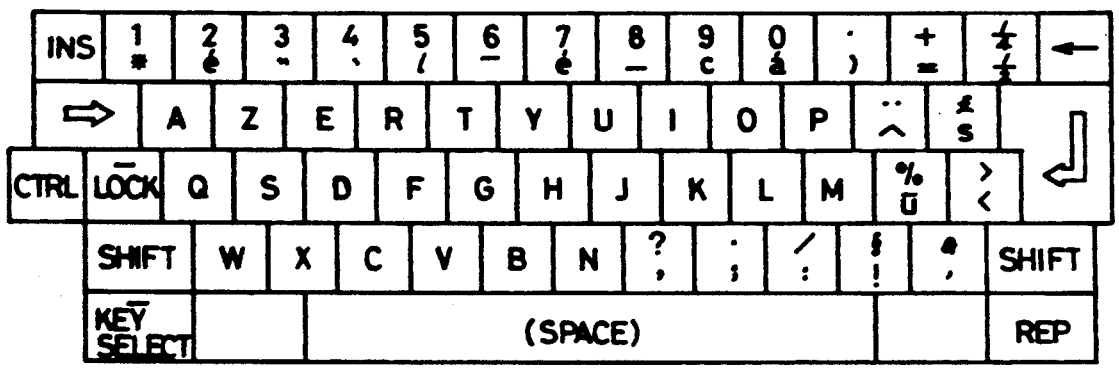

FIGS. 5(A) and 5(B) are character codes used for the keyboard of FIG. 1. The operator can select the key switches to freely correspond to the character codes by control codes.

FIG. 2 relates to a keyboard for English. FIG. 3 is a keyboard for German. FIG. 4 is a keyboard for French.

According to the first preferred embodiment of the present invention, code information is inputted from the keyboard and the inputted information is assumed to be position information for selecting the key switches positions rather than the character information. Based on the position information, a memory is provided for serving as a parameter table to translate the position information into the character information, so that any subsequent word processing is accomplished.

Figure 6:
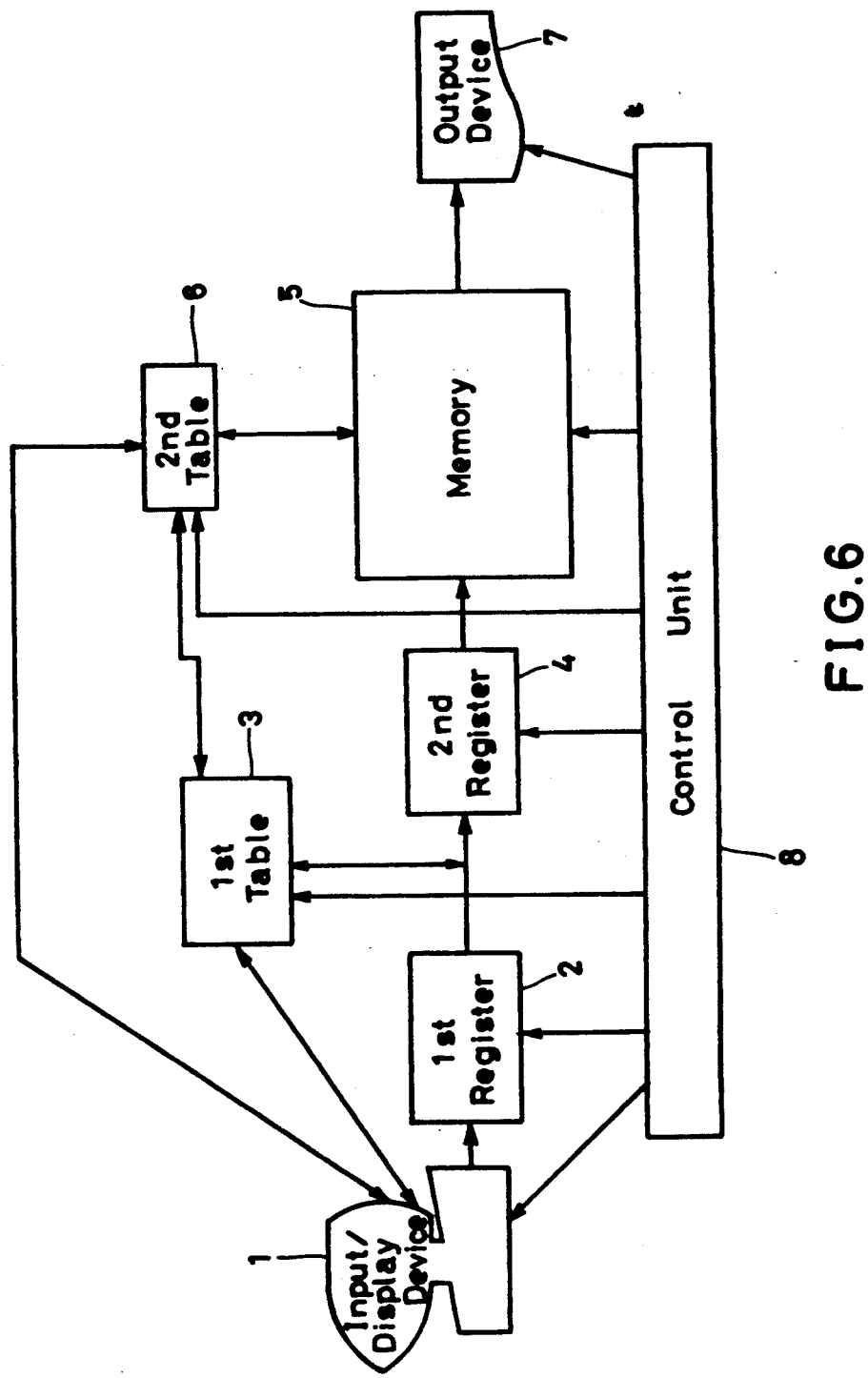
FIG. 6 is a block diagram of a word processor according to the first preferred embodiment of the present invention.

FIG. 6 is a block diagram of a circuit of the word processor according to the first preferred embodiment of the present invention.

The circuit of the word processor of FIG. 6 comprises an input/display device 1, a first register 2, a first table 3, a second register 4, a memory 5, a second table 6, an output device 7, and a control unit 8.

The input/display device 1 is provided for inputting the position information into the first register 2. The position information is applied to select character and word information to be inputted into the memory 5. The position information represents the position or positions of an actuated key switch or switches. The device 1 serves to display on its cathode-ray tube (CRT) the information from the first table 3 and the second table 6.

The first register 2 is provided for storing the position information from the input/display device 1. The first table 3 is provided for storing the code information used for translating the position information in the first register 2 into the character information set by the operator, and storing information representative of a type of printing means such as a daisy wheel, crown, or the like.

The second register 4 is provided for storing the character information as selected by the first register 2 and the first table 3.

The memory 5 is provided for storing the character information processed by the input/display device 1, the two registers 2 and 4, and the first table 3. Further, it appropriately communicates with the second table 6 in order to detect which type of printing means of the second table 6 should be operated, thereby checking how to prevent the output operation of the output device 7 from stopping.

FIGS. 13(A) through 13(D) are information of the second table 6. The table 6 serves to check the character data in the memory 5.

The output device 7 outputs the information as stored and edited by the memory 5. The control unit 8 is provided for controlling the data communication between the circuit elements 1 through 7.

The operator operates the word processor as follows: Before processing the words, the operator modifies the data in the first table 3. A conventional key interface is operated to provide the position information for shift-in, shift-out, the alphanumeric characters, and Japanese "katakana", and information whether the control or the ALT function keys are operated. In response to these items of information, some character code is introduced into a location in the first table 3.

More particularly, with reference to FIG. 7, conditional flags ① are provided for representing that when each of the normal, control, and ALT modes is selected, the code table of either FIG. 5(A) or 5(B) should be used. Conditional flags ② are used to switch on or off each item of the character information present in the print wheel selected by the second table 6. The wheel is operated in response to the operator's instruction. When the print wheel as coupled to the output device 7 is special, the corresponding bit of the conditional flags ② is on. When some characters absent in the ON condition are to be selected, such an operation is assumed to be irregular, so that an indication is provided such as a buzzer or "prompt" information outside.

In FIG. 7, the conditional flags ① are unchanged, as long as a key relating to "00H" of the position code is operated, a code corresponding to "52H" can be outputted. "H" designates a hexadecimal notation. If the conditional flag ① is "000000", character information for "ê" can be outputted because "52H" in the position information "00" is selected regardless of the selection of either the normal mode or the control mode or the ALT mode. If the conditional flag ① is "000100", "ê" can be outputted in both the normal mode and the ALT mode, but in the control mode the character information of "<" is outputted. If the position information is "FF" and the conditional flag ① is "00", character information "S" is outputted in the normal mode and character information "T" is outputted in the control mode, and character information "u" is outputted in the ALT mode.

Figure 9:
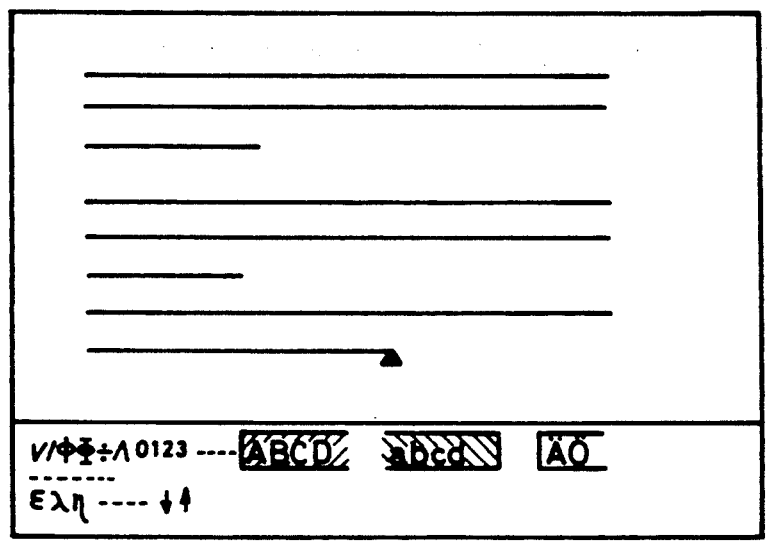
FIG. 9 is an example of a display in a display screen according to the first preferred embodiment.

The operator can enable the display screen to display the items of the character information which can and cannot be used in response to the input instructions. As shown in FIG. 9, the CRT display is divided into two portions. In the upper CRT portion, the presently inputted characters are displayed while in the lower display portion all the characters presently supported by the word processor in which the characters corresponding to the print wheel as presently coupled to the processor are reversed as designated in shaded areas in FIG. 9.

Further, according to the first preferred embodiment of the present invention, it is possible to check which print wheel should be operatively coupled to the word processor depending on the style of the words. This check can be done before the inputted words are to be printed. That result can be displayed in the CRT display. As shown in FIG. 8, the word style to be printed out is preliminarily selected, including the character pitch and the middle class. Before starting the print out operation, the operator's instruction is awaited. Based on such information, a message is displayed indicating which print wheel should be used to reduce the number of replacing a plurality of print wheels as much as possible. The right column of the table of FIG. 8 is a group of characters. The contents of "Elite" are illustrated in FIG. 10, "Courier" is illustrated in FIG. 11, and "Pica" is shown in FIG. 12.

The second table 6 stores the many items of information of FIGS. 8, 10, 11, and 12. The input/display device 1 can be operated to change the information in the second table 6 in the same manner as in the first table 3.

According to the first preferred embodiment of the present invention, as stated above, the word processor can check whether it is provided with the print wheel with the printing characters corresponding to the input characters. It is possible that this check is done upon inputting the input characters. Otherwise, after preparing and inputting the words or during storing the words, it is detected which printing wheel, including the print wheel as presently coupled and not coupled, can print out the current input characters. Therefore, the print out operation cannot be prevented.

In a second preferred embodiment of the present invention, the word processor is equipped with an automatic-hyphenate function. The automatic-hyphenate function is referred to as the function in which a word bridging two lines is automatically hyphenated in the first line. It may be possible all the words are stored with hyphenate information. However, it is rather disadvantageous that all the words are accompanied with the hyphenate information. For example, "ahead" can be hyphenated as "a-head", but this is not a preferable hyphenate form.

According to the second preferred embodiment of the present invention, only a selected group of words each having predetermined letters or more, preferably, six or more are accompanied with hyphenate information to compress the data memory. Hyphenate-position information is added to the words each having 6 letters or more in addition to its spelling information.

Figure 14:
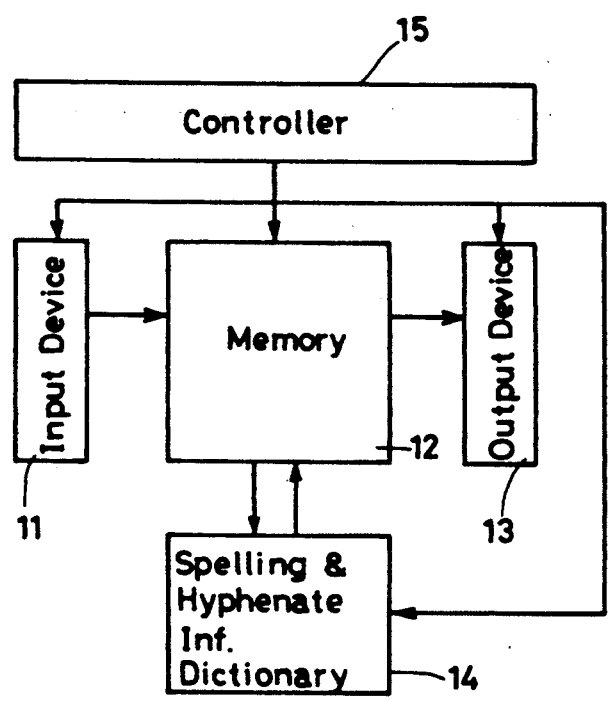
FIG. 14 is a block diagram of a circuit of a word processor according to a second preferred embodiment of the present invention.

FIG. 14 is a block diagram of a circuit of a word processor according to the second preferred embodiment of the present invention. The word processor 1 comprises an input device 11, a memory 12, an output device 13, a spelling and hyphenate information dictionary 14, and a controller 15.

The input device 11 is provided for inputting spelling information into the memory 12. Preferably, it may be a keyboard, a tablet input apparatus, an optical character recognition (OCR) or the like.

The memory 2 is provided for storing the spelling information from the input device 11. It may be a core memory, an integrated circuit (IC) memory or the like.

The output device 13 is provided for outputting the contents and the edited results of the memory 12. It may be a printer, a display, or the like.

The spelling and hyphenate information dictionary 14 is provided for storing the spelling information corresponding to the words as stored in the memory 12 and hyphenate information corresponding to the words each having six or more letters. It may be a read only memory (ROM).

The controller 15 is provided for controlling the operation of all the circuit elements.

Figure 15:
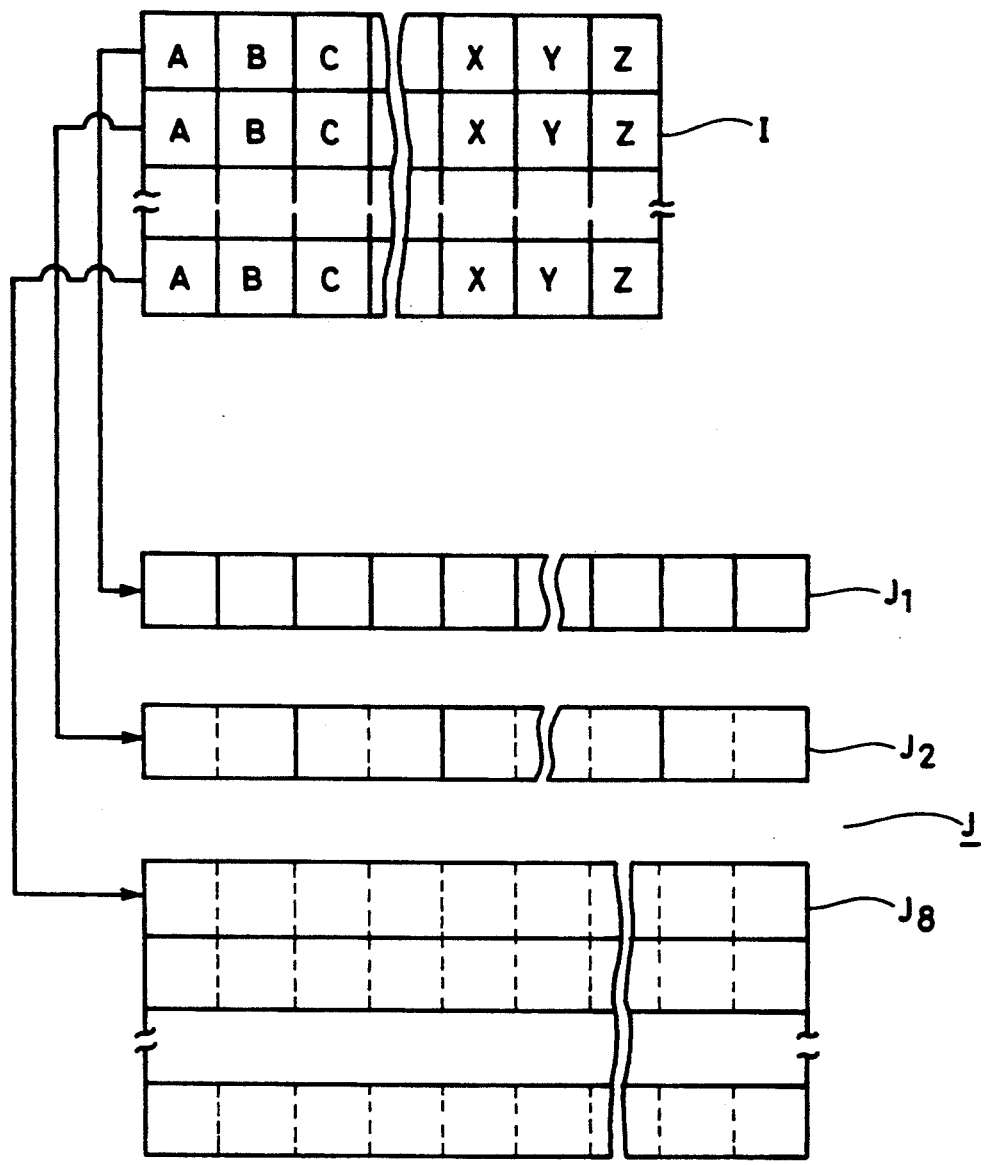
FIG. 15 is an illustration of a configuration of a spelling and hyphenate information dictionary connected in the circuit of FIG. 14.

FIG. 15 shows a structure of the spelling and hyphenate information dictionary 14. It contains index locations I and spelling and hyphenate data memories J. The index locations I storing the number of the words are provided with letter-number classification locations each consisting of first-letter classification locations. In the letter-number classification locations are provided for storing the number of the words depending on their total letter number, 1-letter words, 2-letter words, 3-letter words, 4-letter words, ... 8-letter words, and so on. Each letter-number locations are further divided into the first-letter locations storing the number of the words according to their first letters, "A", "B", "C", ..., "X", "Y", and "Z". In FIG. 15, the letter-number locations are 1-letter location, 2-letter location, and 8-letter locations from the top. Each first-letter location is labelled with its initial letter of "A", "B", "C", ..., "X", "Y", and "Z".

Further, the spelling and hyphenate information data locations J are provided for storing the spelling data and the hyphenate information data. The locations J comprise memories J1, J2, ..., and J8. In each location, each of the second and the subsequent letters is converted into 5-bit data. The following TABLE shows the bit conversion correspondence.

TABLE I

| Character | Data |
|---|---|
| A | 00001 |
| B | 00010 |
| C | 00011 |
| D | 00100 |
| E | 00101 |
| G | 00111 |
| H | 01000 |
| I | 01001 |
| J | 01010 |
| K | 01011 |
| L | 01100 |
| M | 01101 |
| N | 01110 |
| O | 01111 |
| P | 10000 |
| Q | 10001 |
| R | 10010 |
| S | 10011 |
| T | 10100 |
| U | 10101 |
| V | 10110 |
| W | 10111 |
| X | 11000 |
| Y | 11001 |
| Z | 11010 |
| ' | 11011 |

(The last term is an apostrophe.)

It is assumed that the following 8 words in TABLE II are stored.

TABLE II

| No. | Word |
|---|---|
| 1 | AM |
| 2 | AN |
| 3 | ALL |
| 4 | ARM |
| 5 | PLAN |
| 6 | PLAY |
| 7 | DELICATE |
| 8 | DELIVERY |

The following letter or letters are to be stored in the dictionary.
"AM": M
"AN": N
"ALL": LL
"ARM": RM
"PLAN": LAN
"PLAY": LAY
"DELICATE": ELICATE
"DELIVERY": ELIVERY To satisfy the correspondence of the memory capacity of 1 byte=8 bits, dummy data (bit off) "X" are added as follows:
M→01101XXX→68H(Hexadecimal)
N→01110XXX→70H
LL→0110001100XXXXXX→6300H
RM→1001001101XXXXXX→9340H
LAN→011000000101110X→605CH
LAY→011000000111001X→6072H
ELICA-
TE→00101011000100100011000011010000101001 10-
0XXXXXXX→2B1230D0A600
ELIVE-
RY→001010110001001101100010110010110010 1001-
0XXXXXXX→2B1362CB2900

In the above words, six or more letters are included within "DELICATE" and "DELIVERY". According to the second preferred embodiment of the present invention, the hyphenate information is annexed at the end of the data for the letters, together, in the unit of bit. If the word has letters to be hyphenated, "1" is provided while no hyphenate information is required, "0" stands.

Further, in the second preferred embodiment, in a word, no hyphen is inserted before the first letter and the last letter. Therefore, the hyphenate information corresponds to the bits defined by "the number of all the letters minus 2".

For example, while all of the lettes in a word "DELI-CATE" are "D E L I C A T E", "DEL-I-CATE" can be hyphenated. The following hyphenate information is provided.

D∘E∘L●I●C∘A∘TE

Where white dot designates that no hyphen is provided while the black dot designates that a hyphen is provided. Therefore, the hyphenate information of "001100" is defined. (It is to be noted that "001100" of six bit information precedes "XXXXXXX" in the memory bit for "ELICATE".)

A word "DELIVERY" contains letters of "D E L I V E R Y". The following locations can be hyphenated.
DE-LIV-ER-Y The hyphenate informaiton should be added as follows:

D∘E●L∘I∘V●E∘RY: 010010

(It is also to be noted that the information "010010" is the six bit information prior to "XXXXXXX" in the memory bit for "ELIVERY".)

Figures 16, 17:
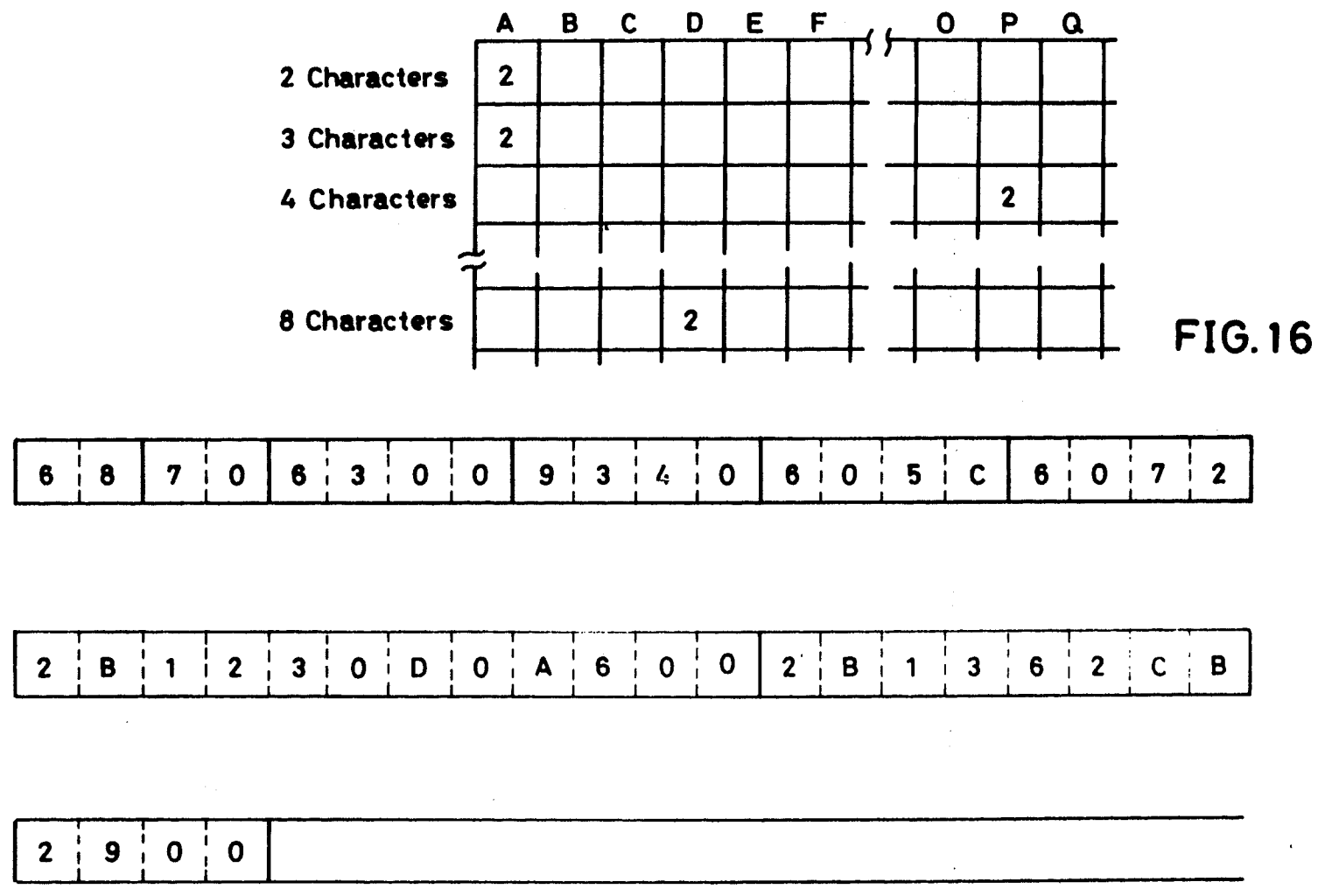

Here, FIG. 16 shows a structure of the index dictionary storing the words in TABLE II. FIG. 17 shows a structure of the data memory.

Of course, it may be possible that the hyphenate information is provided with each of all the letters forming the word. Such a system is disadvantageous because it takes long to detect the hyphenate information when two words have some of identical high-significant letters, but they are hyphenated at the different position as in the case of "DELICATE" and "DELIVERY".

Therefore, according to the second preferred embodiment of the present invention, after all the spelling data are first detected, the hyphenate information is detected. Further, the hyphenate information is annexed to the end of the spelling data, together. If the hyphenate information is inserted between the letters, it may be difficult to quickly check the spelling of the words.

Further, according to this second preferred embodiment, while each of the letters is converted in 5 bits, the checking of its spelling is conducted in the unit of byte, so that rapid checking speed can be expected rather than the case of checking in the unit of bit. For this purpose, within the word data, some dummy data are inserted.

In the second preferred embodiment, since the hyphenate information is added only to the selected group of words, preferably, six or more letters, memory data can be compressed.

Further attention is directed to a third preferred embodiment of the present invention in which a message sentence as provided by a word processor asking for the system operation or instruction can be modified by the operator.

Figure 18:
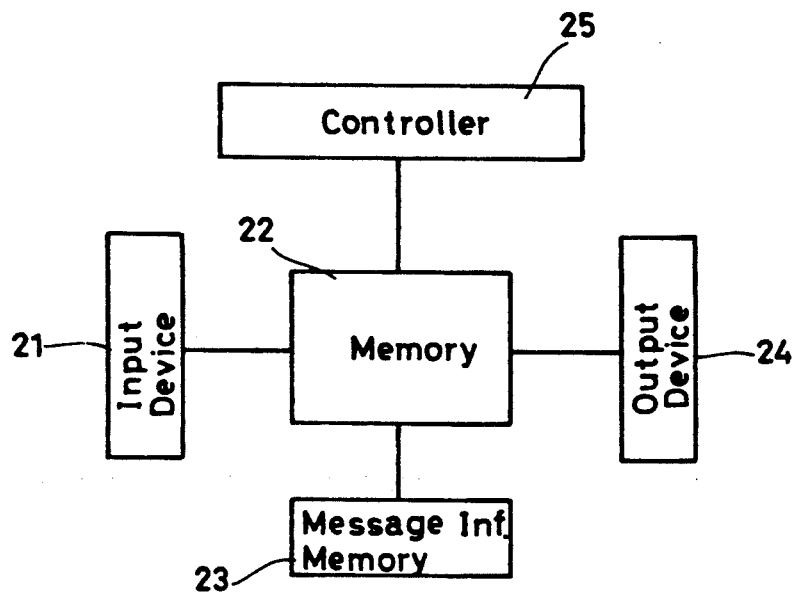
FIG. 18 is a block diagram of a word processor according to a third preferred embodiment of the present invention.

FIG. 18 is a block diagram of a word processor according to the third preferred embodiment of the present invention. The circuit of FIG. 18 comprises an input device 21, a memory 22, a message information memory 23, an output device 24, and a controller 25.

The input device 21 is provided for spelling information and numerical information into the memory 22. The memory 22 stores the input information and menu message information. The menu message information is used to operate the application software in the message information memory 23. The memory 22 provides and edits the information to be outputted and printed out by the output device 14. The controller 25 is provided for controlling these elements.

According to the third preferred embodiment, the menu message is "Prompt Message", "System Message", "Error Message", and "Utility Message".

Normally, a plurality of "Prompt Messages" are not displayed in the CRT display. They designate some special control codes so that if the cursor is positioned at the corresponding position, they become displayed. Examples of "Prompt Message": Begin Keep, End Keep, Begin Und, End Und, Begin D-Und, End D-Und, Begin Bold, and End Bold.

A plurality of "System Messages" store letters which are normally displayed in the menu picture in the CRT display. Examples of them: Task Selection, ID ITEM, Create Document Task, Revise Document Task, Paginate Task, Request (Print) Task, Create Format File, Revise Format File, and Create Glossary File.

A plurality of "Error Messages" are to advise the operator that the system of the word processor detects some error condition. Examples of "Error Message": Invalid Key, Adjust Line Ending=No For This Line, Cannot Remove File End, Character Cannot Be Corrected Using Bksp., Characters Not Found, Characters Not Specified, Cursor Cannot Move, and Invalid Choices, Type Or Change Choices.

A plurality of "Utility Messages" are provided to display when the program for the utility is executed. Examples of "Utility Message" are: Task Selection, ID ITEM, Create Document Task, Revise Document Task, Paginate Task, Request (Print) Task, Create Format File, Revise Format File, Create Glossary File, Revise Glossary File, Change Base Format, and Circular Letter Task.

Unless "Utility Message" and "System Message" are operated simultaneously, the same locations can be used for them.

Figures 19A, 19B:
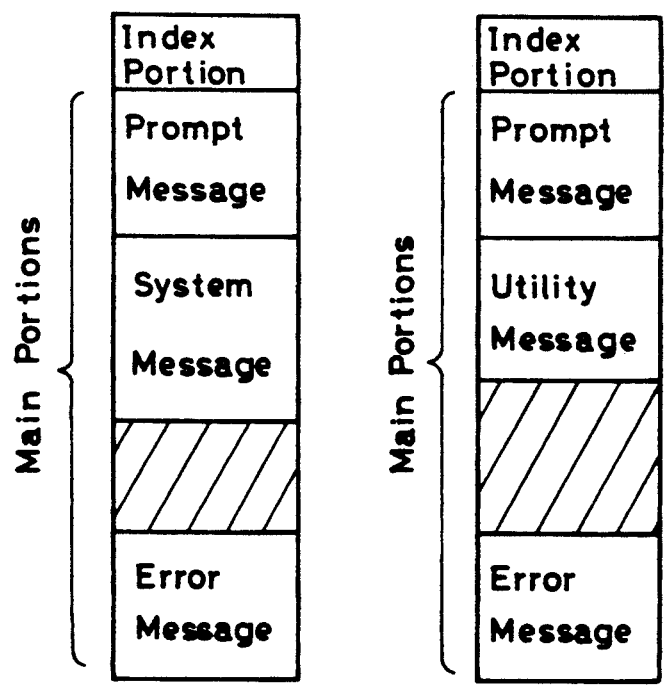
FIGS. 19(A) and 19(B) are drawings of a data format of message data used for the circuit of FIG. 18.
Figures 20, 21, 22:
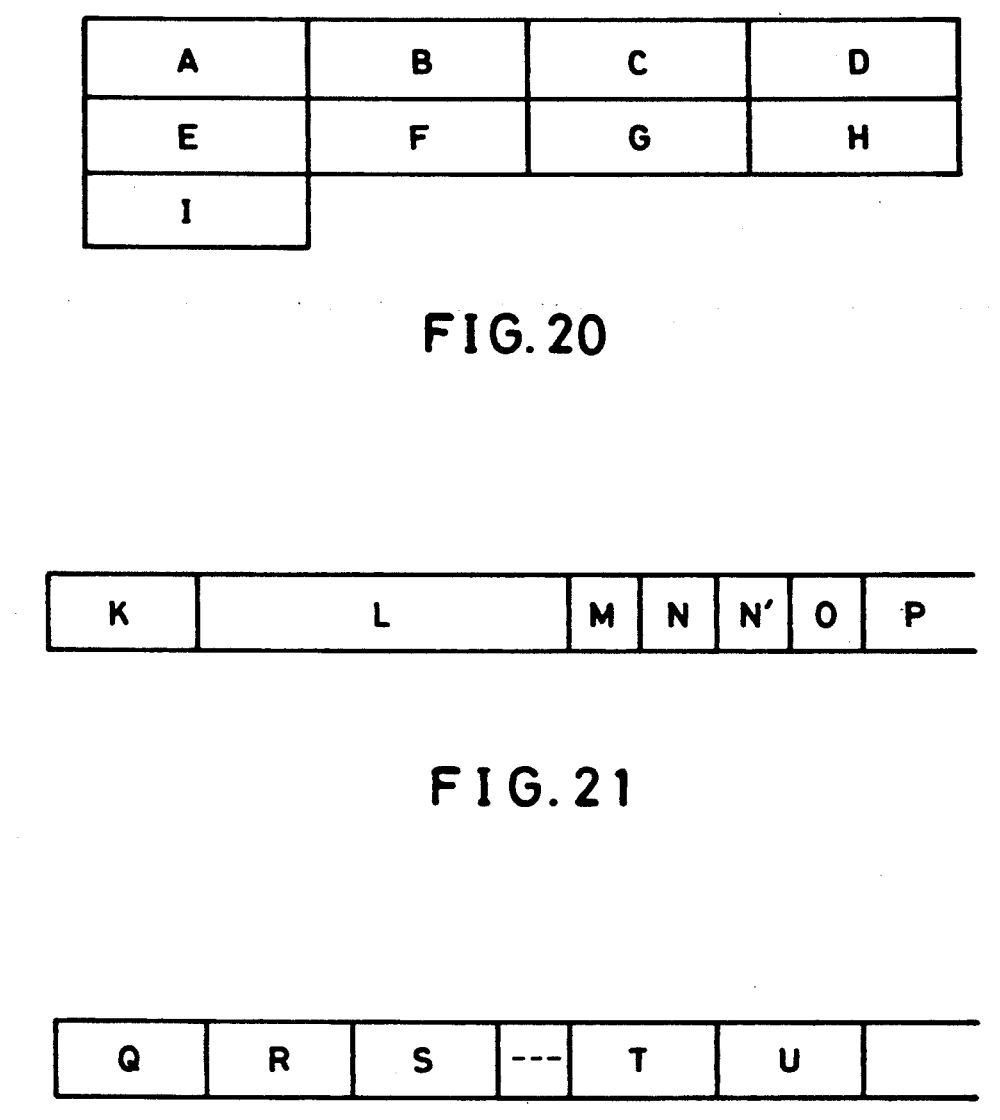

FIGS. 19(A) and 19(B) show the structure of the message data used for the third preferred embodiment. As apparent from FIGS. 19(A) and 19(B), the message data are classified into an index portion and main portions. In the index portion, the data as shown in FIG. 20 are stored as follows:

A location: the total byte number to be used in the index portion is stored.

B location: a relative address number is stored which indicates how far the "Prompt Message" is from the main portions.

C location: the number of the "Prompt Messages" is registered.

D location: a relative address number is inputted which indicates how far the "System Message" is from the main portions.

E location: the number of "System Message" to be registered is inputted.

F location: a relative address number is inputted which indicates how far "Utility Message" is from the main portions.

G location: the number of "Utility Messages" registered is inputted.

H location: a relative address number is inputted which represents how far "Error Message" is from the main portion.

I location: the number of "Error Messages" registered is inputted.

As shown in FIG. 21, "K" stores the value of the messages in the first item. In conformance with the contents of "K", "L" stores the letters of the messages sentence. "M" contains a message end code. "N" and "N" include picture information in which the corresponding message information is displayed. "O" stores a final end code for the first record. "P" stores the volume of the next message of the second item.

FIG. 22 shows locations for the picture information. The locations of FIG. 22 are provided for storing all the picture information to be displayed by the present system as follows:

Q location: the number of the messages to be displayed in a single picture display is stored. The number of the messages indicates what number of items of the message information is used, including only the normally displayed messages and excluding the urgent ones.

R location: Coordinate information is stored representing where to display "S" (the message sentence of FIG. 21) in the picture display.

S location: the numerical information is stored representing both which group of "System Message", "Prompt Message", "Utility Message", and "Error Message" the current message belongs to, and what serial number of the message group the current message is positioned.

"R" and "S" are repeated by times as defined by the information of "Q".

T location: a separation code is stored, indicating the divisions of the messages in the single picture display.

U location: the message information to be used in the next picture is stored. If "FF" (Hexadecimal) is stored, it represents that the whole control should end.

The third preferred embodiment of the present invention will be described in terms of exemplary data.

To provide the picture as indicated in FIG. 23, it is necessary to input the data of FIG. 24 into the tenth picture location in the picture locations of FIG. 22. "12" of FIG. 24 indicates that 12 types of messages are used in the picture. "02" in "02120073" at the second item of FIG. 24 indicates the second line and "12" indicates that 12th colon and the susequent colon(s) display the following messages in the picture display. "073" of "02120073" represents that a message "Change Page Format" is stored in a picture location numbered as "073". The message of "ID ITEM" is stored in the location of "0001" in the third item.

FIG. 27 shows a structure of conditions that the specific messages are stored into the memory of FIG. 23. As apparent from FIG. 27, some correlated data are modified in such a manner that the message itself is modified as indicated in FIG. 27, the picture use information in the picture is changed, and that the position information or the serial number registration information are altered as indicated in FIG. 24. The operator can freely handle the message information.

The modification, addition, deletion of the message sentence are carried out as follows as explained with reference to FIGS. 25(A) through 25(C).

A message modification mode is first selected so that a zero-numbered message of "00-00" in the system is displayed as shown in FIG. 25(A). A SKIP key is operated to subsequently address and display the heads of group messages. Two CURSOR movement keys are operated to subsequently display the message data. As shown in FIG. 25(B), to change "Change Format (Page)" to "Change Page Format", an ENTER key is operated. Then, as shown in FIG. 25(C), a message enter-available region of an elongated box is displayed under the current message, so that a new message is inputted. In response to the operation of the ENTER key, the replacement of the message is completed.

To add some new messages, during displaying "REST XXXX BYTE", the CURSOR movement keys are operated to shift the cursor in no-entered regions, so that the ENTER key is actuated to input some new data. To alter the picture use information number, a CHANGE key is operated to display the data enter-possible region under the current picture use information number. Displayed messages can be deleted by operating a DELETE key and the ENTER key. The system checks the correlation of the data so that if any error is detected, the condition is displayed.

To change the menu data of FIG. 23 to those of FIG. 26, the messages of FIG. 27 are changed to those of FIG. 28 in order to complete the menu sentences.

As shown in FIG. 29, the message sentences in English are changed to those in German so that the menu messages in German can be formed as shown in FIG. 30.

When a plurality of message files are provided, in response to the actuation of some switch in starting power supply or some parameter in the base format information, any message can be automatically accessed in which messages written in multilanguages can be presented. In such a case, the modification mode menu of FIG. 31 should be processed.

To change the menu sentence, the conventional operation in the English word processor is carried out so that when the system displays the corresponding message, the CHANGE key is operated to move the corresponding message. The ENTER key is actuated in which the menu messages of FIG. 25(C) are formed by modification. After the modification, the previous picture is recovered. In this method, "Prompt message" and "Error Message" cannot be modified, though.

Further attention is now directed to a fourth preferred embodiment of the present invention for improving a search and replacement function. This function is referred to as an operation in which one or more specific letters in a specific region are searched and replaced by new one or more letters in a word processor.

The following controls are used for the search and replacement function in the fourth preferred embodiment of the present invention:

(1) Each time corresponding letter or letters are detected, the operator instruction is awaited.

(2) After a sentence region for searching and replacing one or more specific letters is defined, the search and replacement function is carried out totally once over this region.

(2)-(i) The region is defined in terms of page number.

(2)-(ii) The region is defined by moving the cursor defining the region for starting and stopping the search and replacement function.

(2)-(iii) the number of repeating to search and replace the one or more letters by new ones is defined.

(2)-(iv) When one or more specific letters are reached in searching, the searching and replacement function is stopped.

Figures 32, 35:
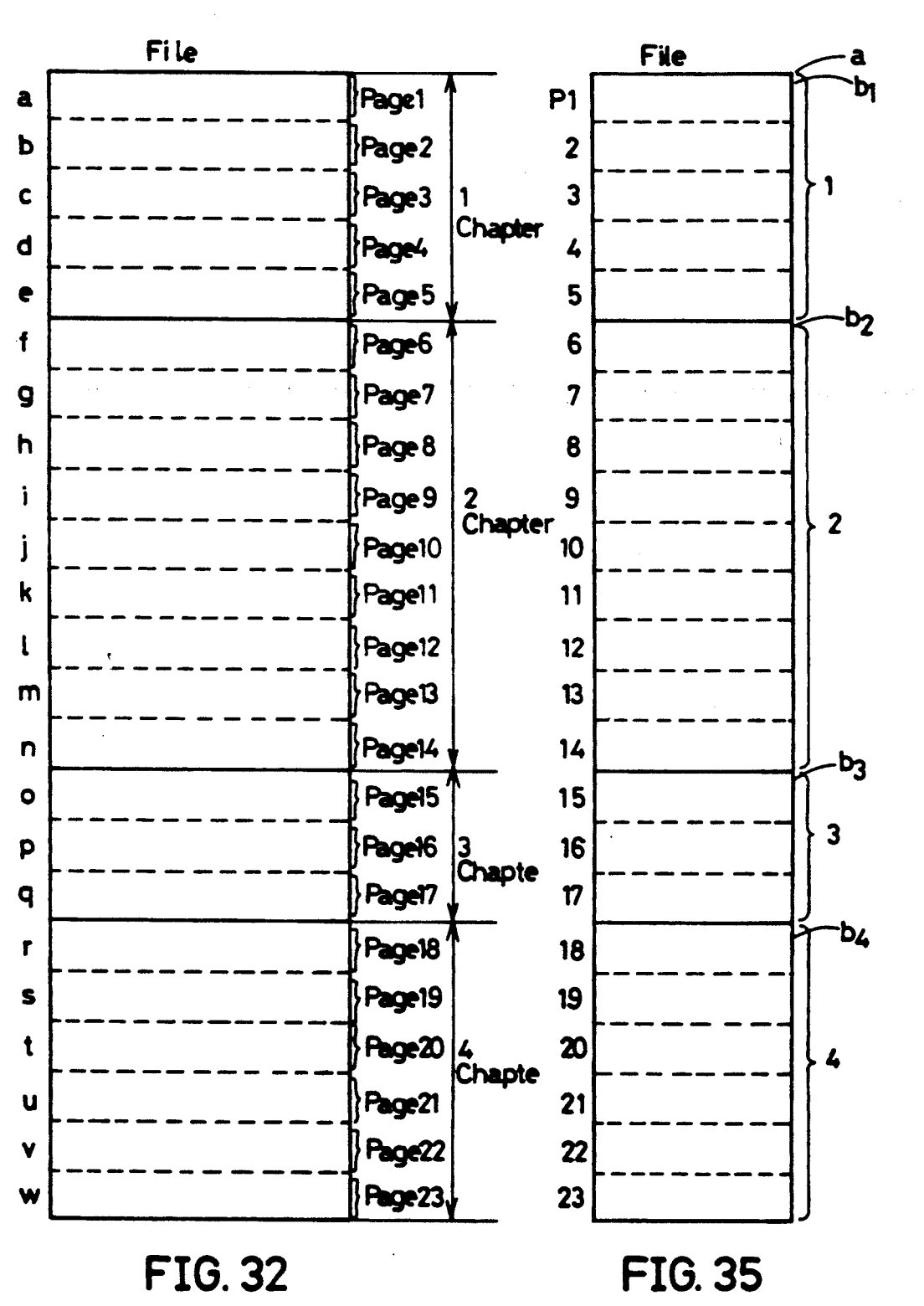

The word processor of the fourth preferred embodiment of the present invention has a sentence file characterized in that the sentence data are each stored in the unit of page as shown in FIG. 32. The sentence data are separated by several chapters and paragraphs as shown in FIG. 33. In the printed-out data are headed by running head titles H as shown in FIG. 34. The footnotes may be also provided in pages. The positions of having the running head titles (or footnotes) are stored as shown in FIG. 35 in which heads b1, b2, b3, and b4 of pages 1, 2, 3, and 4. "a" of the data of FIG. 35 stores format information. The format information defines the following items:

(a) Page Size (vertical and horizontal)
(b) First Typing Line (a line of staring the typing)
(c) Last Typing Line (a line of ending the typing)
(d) Line/inch (an inch spacing for a single line: 8 inch, 6 inch etc.)
(e) The Right and Left Margins
(f) Line Space (the number of changing the line or lines by using the Return key)
(g) Space Pitch: 10, 12, and 15 pitch or Proportional Spacing (PS)
(h) Tab Position
(i) Auto Hyphenation YES or NO
(j) Style Information
(k) Auto Wraparound YES, or NO
(l) Justification YES, or NO Normally, these data are set at the head of the sentence file. They are effective unless changed.

Since the sentence file is modified, changed, added, and deleted, the paging of the sentence file should be added and changed accordingly. Conventionally, it is difficult for the word processor to store each page number of starting the corresponding chapter in the sentence file. To conduct the search and replacement function in the unit of chapter, conventionally, the cursor must be moved at the desired positions, so that it is rather troublesome.

According to the fourth preferred embodiment of the present invention, an improved search and replacement function for searching and replacing one or more letters in the unit of chapter.

Figure 36:
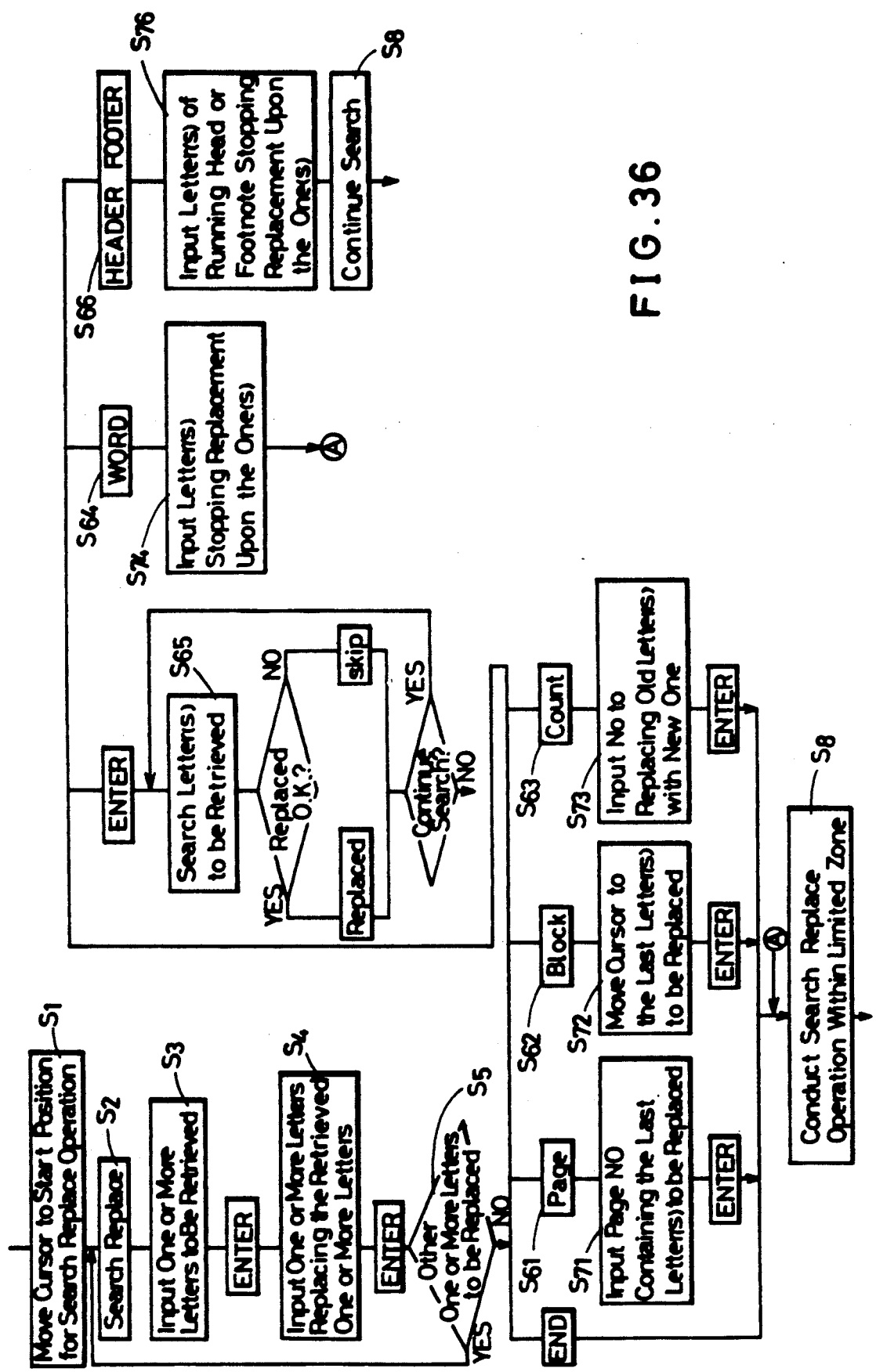
FIG. 36 is a flow chart of the operation of the word processor according to the fourth preferred embodiment of the present invention.

FIG. 36 shows a flow chart of the operation for the search and replacement function according to the fourth preferred embodiment of the present invention. The word processor of this preferred embodiment comprises a control circuit operating the following steps:

Step S1: The cursor is positioned at the program start position to start the search and replacement function.

Step S2: The instruction of starting the search and replacement function is inputted.

Step S3: One or more letters to be retrieved are inputted.

Step S4: One or more letters are inputted which replace the retrieved one or more letters.

Step S5: Inputted one or more letters are confirmed to detect whether other one or more letters to be retrieved are present or not.

Steps S61 and S71: The page number is inputted and selected to conduct the operation of operation (2)-(i).

Steps S62 and S72: The stop position is inputted to conduct operation (2)-(ii).

Steps S63 and S73: The replacement number is inputted to conduct operation (2)-(iii).

Steps S64 and S74: One or more letters are inputted to conduct operation (2)-(vi).

Step S65: The one or more letters are retrieved according to operation (1). Till the retrieval stop instruction, the retrieval continues.

Steps S66 and S76: The running head titles and footnotes forming the sentence data are inputted to define a retieval region. When these running heads and the footnotes are detected, the replacement is stopped.

Step S8: Within the defined region, the search and replacement operation is conducted.

According to the fourth preferred embodiment of the present invention, the head title "Sorting" is selected as shown in FIG. 33, the search and replacement function is carried out over pages 1–379. When the head "Optimum Sorting" is selected, the search and replacement function is carried out over pages 181–246. Meanwhile, even when the format information is changed and the page number of FIG. 33 is changed, no change in paging can be required according to this preferred embodiment of the present invention.

Thus, according to the fourth preferred embodiment, the sentence region for the search and replacement function is defined using the running head title and the footnotes, the sentence can be edited speedy in the unit of chapter.

While only certain embodiments of the present invention have been described, it will be apparent to those skilled in the art that various changes and modifications may be made therein without departing from the sprit and scope of the present invention as claimed.

What is claimed is:

1. A word processor system comprising:
   memory means for storing print data;
   a plurality of different types of print wheel wheel means for printing out the print data;
   designation means for designating one type of print wheel means among the plurality of types of print wheel means for printing out the print data;
   table means for storing a plurality of character information tables each of which includes information regarding characters supported by a different one of the plurality of types of the print wheel means;
   control means coupling to said table means for identifying characters supported by the type of print wheel means designated by said designation means by referring to the character information table corresponding to the type of print wheel means designated; and
   display means coupling to said table means and said control means for displaying all characters supported by the system and for indicating the characters supported by the type of print wheel means designated.

2. The word processor system as recited in claim 1, wherein said display means comprises a screen divided into two sections, a first of said two sections displaying at least a portion of the print data and a second of said two sections displaying all the characters supported by the system, the characters supported by the type of print wheel means designated having contrasting shading in the second section.

* * * * *